United States Patent [19]
Geyer

[11] Patent Number: 5,855,929
[45] Date of Patent: Jan. 5, 1999

[54] SHREDDING STRAINING APPARATUS

[76] Inventor: Paul Geyer, 210-B N. Lindell Rd., Greensboro, N.C. 27403

[21] Appl. No.: 598,356

[22] Filed: Feb. 8, 1996

[51] Int. Cl.⁶ .............................. B29C 47/62; B29C 47/66
[52] U.S. Cl. ....................... 425/204; 264/211.23; 366/80; 366/81; 366/88; 366/89; 366/90; 366/91; 425/205; 425/208
[58] Field of Search ..................... 425/204, 205, 425/208, 209; 264/211.23; 366/79, 81, 88, 89, 90, 91, 80

[56] References Cited

U.S. PATENT DOCUMENTS

| | | | |
|---|---|---|---|
| 2,744,287 | 5/1956 | Parshall et al. | 425/208 |
| 3,375,549 | 4/1968 | Geyer | 366/83 |
| 3,461,497 | 8/1969 | Geyer | 366/82 |
| 3,745,200 | 7/1973 | Geyer | 264/37 |
| 3,788,612 | 1/1974 | Dray | 366/81 |
| 3,888,469 | 6/1975 | Geyer | 366/79 |
| 4,075,712 | 2/1978 | Geyer | 366/79 |
| 4,140,400 | 2/1979 | Lovegrove | 366/81 |
| 4,779,989 | 10/1988 | Barr | 425/208 |
| 4,802,140 | 1/1989 | Dowling | 425/208 |
| 4,872,761 | 10/1989 | Geyer | 425/208 |
| 4,981,364 | 1/1991 | Geyer | 366/81 |
| 5,302,102 | 4/1994 | Haimer | 425/208 |

Primary Examiner—Patrick Ryan
Assistant Examiner—Joseph Leyson
Attorney, Agent, or Firm—Robert W. Pitts

[57] ABSTRACT

An apparatus for shearing and straining polymeric process material, such a scrap tires includes a rotor and barrel. Large material pieces are feed into a hopper and the material is warmed, pressurized and transported to a rotor—barrel transfer section to initially chop the material to reduce its size. The material then passes to a rotor barrier or refining section where the material must pass over wide top barriers that extend across extrusion grooves. The barriers included multiple ridges and the barrier to bore clearance is progressively reduced as the material passes downstream. Ramp like grooves, where rejected material can be worked further, precede the barrier ridges. A rotor to barrel transfer section, having a conical barrel that can be longitudinally shifted, follows the wide top barriers, so the size to the discharged material can be regulated.

6 Claims, 3 Drawing Sheets

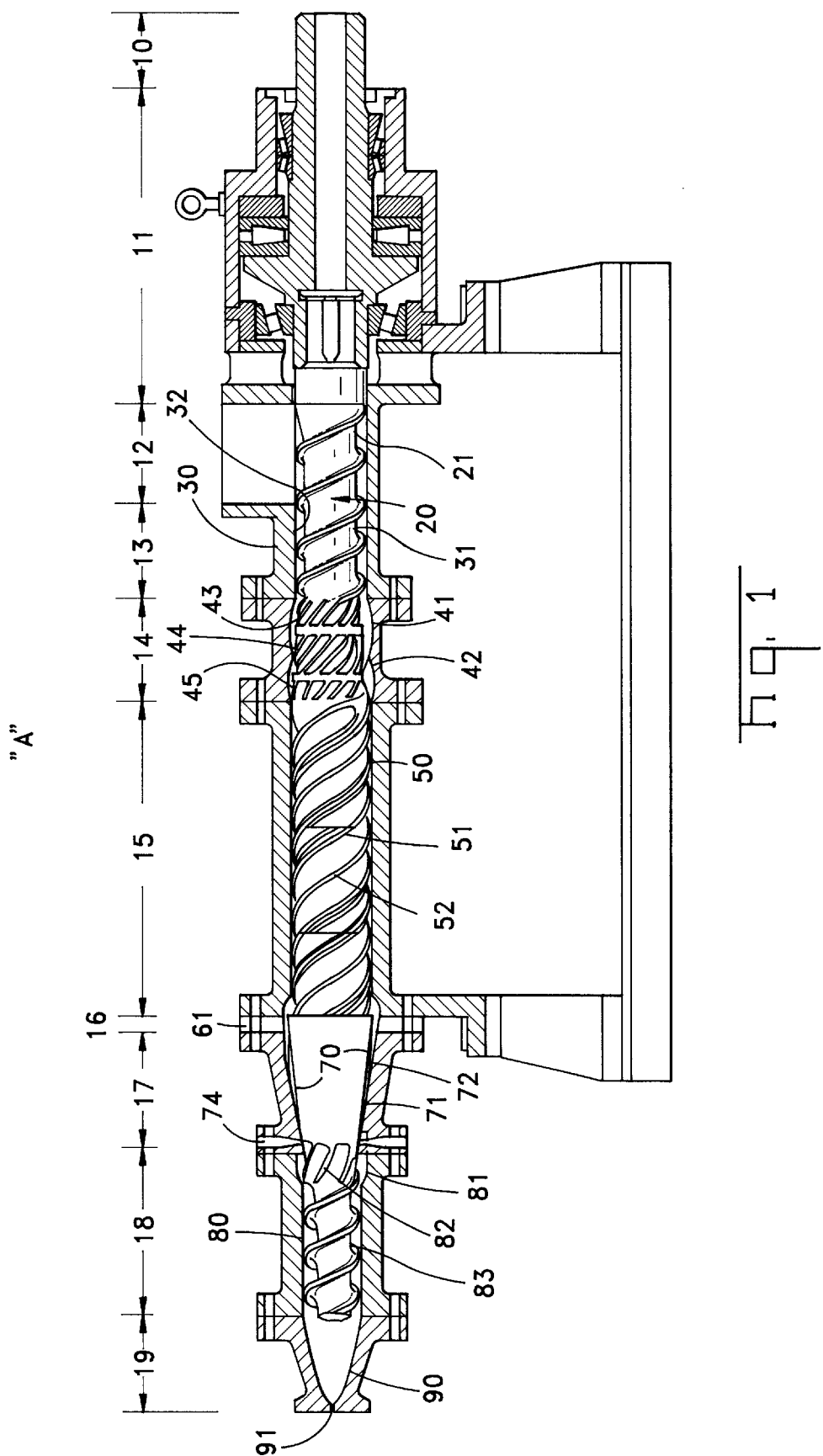

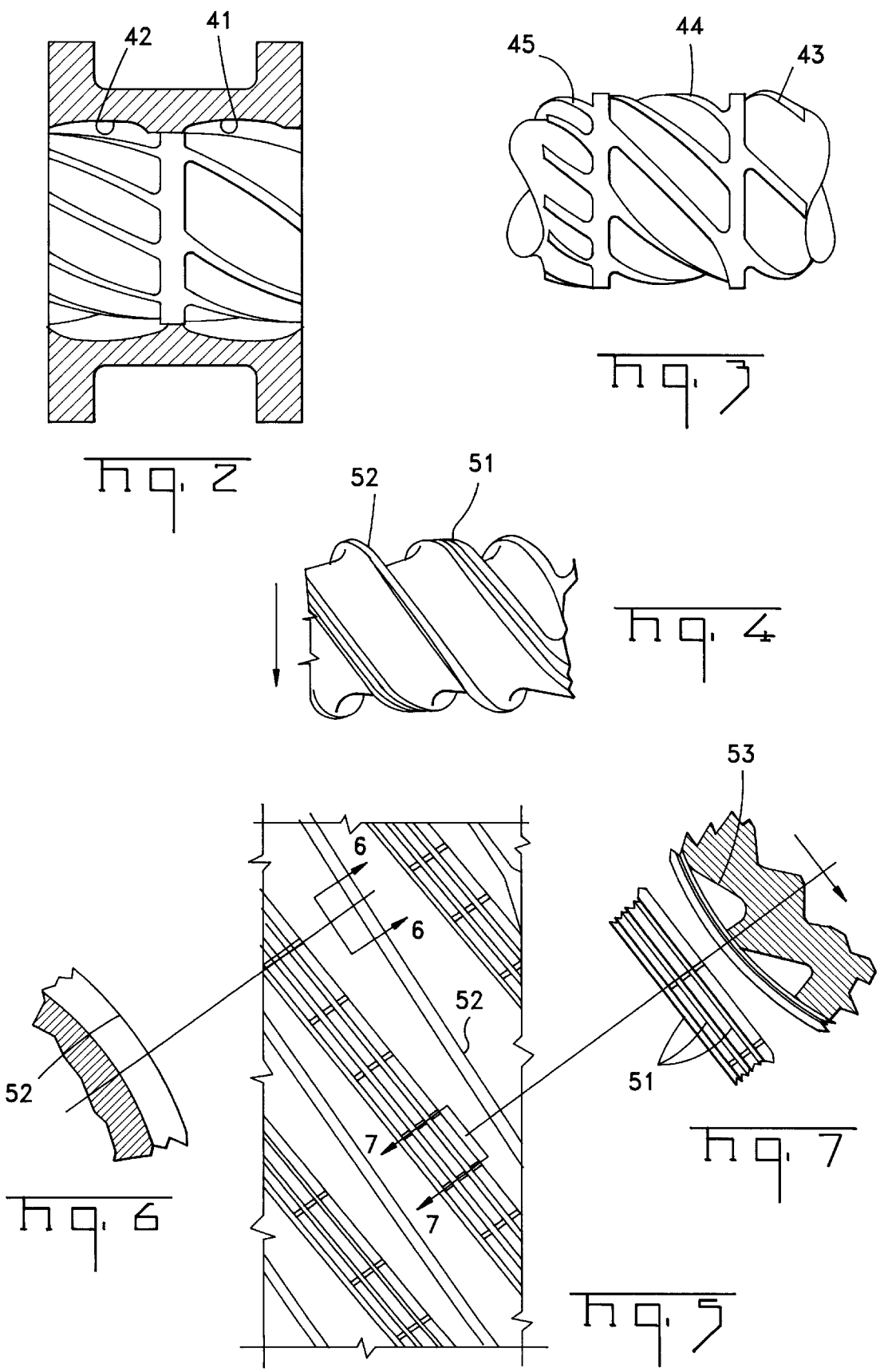

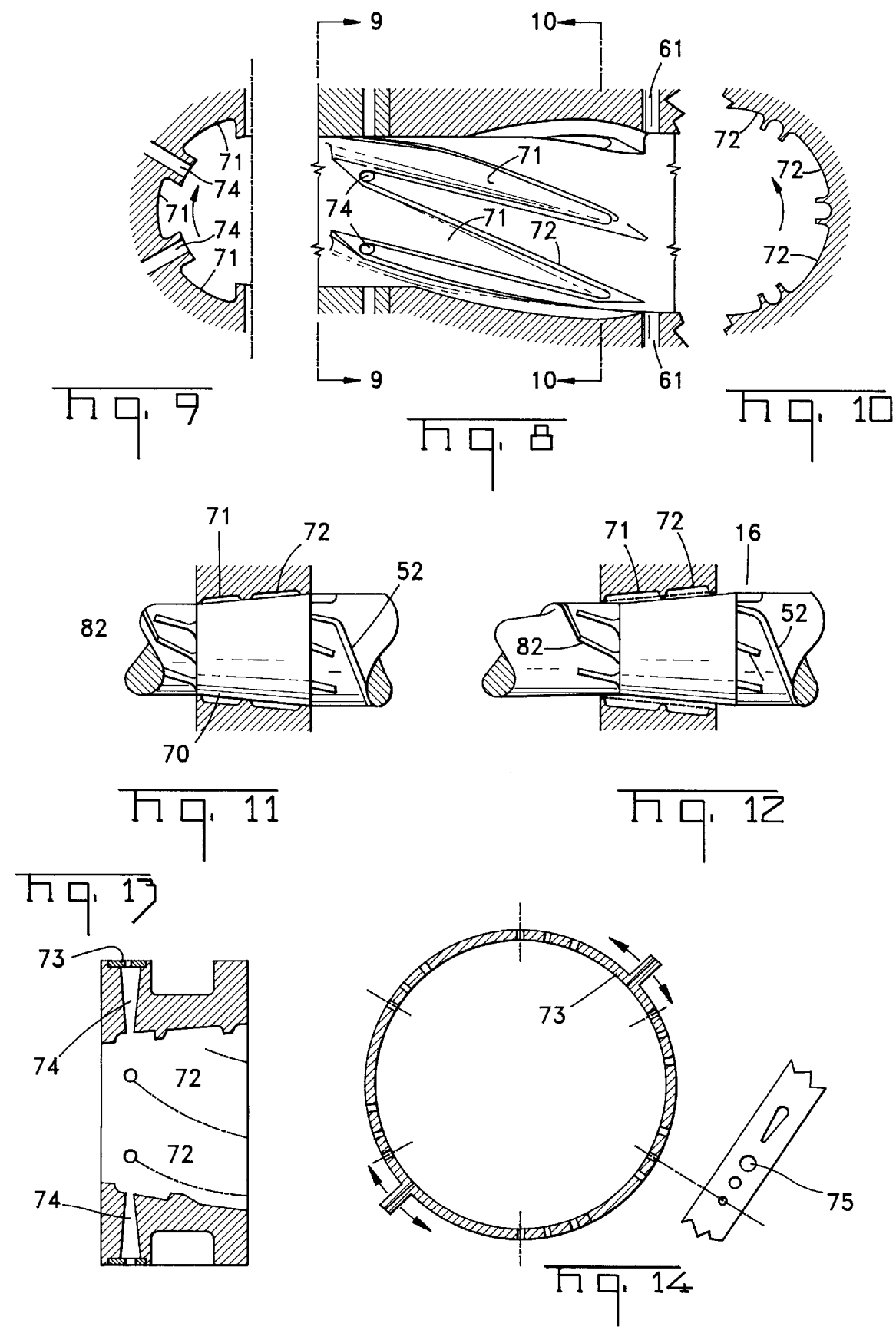

SHREDDING STRAINING APPARATUS

FIELD OF THE INVENTION

This invention relates to an apparatus of the rotor and barrel type for the shredding, straining, granulating of vulcanized rubber like materials and is adapable to thermoplastic materials.

BACKGROUND OF THE INVENTION

The rubber and plastic industries use screen type straining devices with restraining holes to separate over size material from the process material. The restrictive holes progressively become plugged, requiring an increase in extrusion pressure and the resulting increase in extrusion temperature. The plastic industry developed a continuous screen changing device to obtain uniformity. The reclaim of vulcanized rubber has been and is accomplished by warming the material and passing it through a rugged refiner mill which is set at an extremely small nip. The resulting quality is such that very little vulcanized rubber is being processed by this method.

SUMMARY OF THE INVENTION

It is therefore a feature of the present invention to provide a two start extrusion groove in the hopper and forcing section so as to impose a higher shear rate as compared to the usual single start extrusion groove.

It is therefore another feature of the present invention to provide an improved apparatus by providing multiple member to member transfers of the material and thereby exposing it to the intense shear generated between rotor and barrel members.

It is therefore still another feature of the present invention the provide the transfer members rotor and barrel with a progressive increase in the number of extrusion grooves so as to develop smaller and smaller pieces and to develop fluent material to be processed by the following barrier section.

It is, therefore, a further feature of the present invention to provide a multiple stage refining section which is provided with barriers that cross the extrusion groove and establish an area, barrier top to barrel bore, which permits the flow of fine and fluent material and retards the flow of the oversize and less fluent material, so as to be exposed to extra working.

It is another feature of the present invention to provide barriers with a wide tooth top, which is divided into three tooth top ridges, each of which is progressively restrictive to over size and less fluent material.

It is yet another feature of the present invention to provide the upstream side of the barrier ridges, each with an extrusion groove, to provide space for the rejected material. said grooves are composed of ramp like configurations which start deep and end at zero depth, in a manner which rotational movement moves the material from the deep end to the restrictive barrier entrance, and at an extrusion pressure plus.

It is still another feature of the present invention to provide a rotor to barrel transfer of all the material to barrel grooves which connect with the "receiving" grooves of the following tapered diameter barrel refining section.

It is a further feature of the present invention to provide a tapered diameter barrel barrier section with longitudinal extending "receiving" grooves, spaced between "sending" grooves, in a manner such that all acceptable material is passed over the common tooth tops, from the "receiving" grooves to the "sending" grooves.

It is yet another feature of the present invention to provide adjustable clearance, smooth rotor to common tooth tops, by moving the barrel member longitudinally in relation to the rotor member of the tapered section.

A further feature of the present invention is to provide a barrel to rotor transfer, following the downstream end of the tapered section and adapted to transfer all of the material, barrel to rotor.

A still further feature of the present invention is to provide an end forcing section which generates extrusion pressure for extrusion to atmosphere.

BRIEF DESCRIPTION OF THE DRAWINGS

FIG. 1 is a longitudinal elevational view of the shredding straining apparatus partly in section, constructed in accordance with the present invention and represents the preferred embodiment.

FIG. 2 is a sectional view of the barrel member of the member to member transfer.

FIG. 3 is an elevational view of the rotor member of the member to member transfer of the process material.

FIG. 4 is an elevational view of a typical unit of the rotor refining section.

FIG. 5 is a surface development of the extruder grooves of the rotor refining section.

FIG. 6 is a view of an extruder tooth of the rotor refining section.

FIG. 7 is a plan and elevational view of the ramp like structure preceding the restrictive barriers.

FIG. 8 is a sectional view of the tapered barrel adjustable refining section.

FIG. 9 is a downstream sectional view of FIG. 8.

FIG. 10 is an upstream sectional view of FIG. 8.

FIG. 11 is an elevational view, partly in section showing the tapered section in the minimum clearance.

FIG. 12 is an elevational view, partly in section, showing the tapered section in an increased clearance position.

FIG. 13 is a sectional view of the over size discharge port.

FIG. 14 is a view showing the hole size selection of the over size discharge port.

DESCRIPTION OF THE PREFERRED EMBODIMENT

The present invention is provided with a means to continuously supply the downstream transfer section with warmed and under pressure selected process material. For reclaim rubber, which feed material tends to entrain air, U.S. Pat. No 3,888,469 (Geyer) is suggested to return air back to the hopper area.

The following four stage transfer section is provided with an increased number of extrusion grooves at each transfer, i.e. 3 to 6; 6 to 9; 9 to 12 and 12 to 15. The processed material, passed through the section, can be expected to be fluent material surrounding some agglomerates, as it is passed to the following multiple refining section.

(Numbers as used in this application are tentative for a small range of compounds. As the extruder may be used on hundreds of different compounds, the numbers shown can be adjusted, up or down so as to accomplish the desired result.)

The following triple refining section is composed of three stages, each of which can be provided with a barrier, extending across the extrusion groove and provided with a wide barrier top. This wide top is provided with three ridges designed with reduced clearance from ridge top to barrel bore and preceded with a storage groove designed to hold the detained material for extra working. These storage grooves are composed of a series of ramps, each of which, due to circumferential motion, delivers the material to the clearance, ridge top to barrel bore, at extrusion pressure plus. This arrangement, three stages plus three ridges per stage, can be arranged to provide a succession of nine ridges, each of which being more restrictive in the downstream direction. The material reaching the downstream end of the refining section, is transferred rotor to barrel so as to co-act with the barrel "receiving" extrusion grooves of the adjustable tapered barrel refining section.

The tapered barrel refining section is composed of multiple longitudinal extending "receiving" extrusion grooves, which start at capacity and end at zero capacity. Spaced between the "receiving" grooves is an equal number of "sending" grooves, which start at zero and end at capacity. Thereby all of the acceptable material is passed over the groove tops separating the "receiving" and "sending" grooves. Oversize material, in the "receiving" groove, not led off, proceeds to the down stream end of the section, where a discharge port is provided to discharge it to atmosphere. The accepted material in the "sending" groove is transported down stream to the barrel member of a barrel to rotor transfer section.

The novel feature of the tapered refining section is the adjustable means to control the clearance, smooth rotor to the barrel extrusion grooves tooth tops, and to thereby control the size of the passed material, the rate of extrusion, and the temperature of the extrusion. The adjustable means of moving the barrel member in relation to the rotor is accomplished by the thickness of ring like spacers inserted in the barrel member. Thus rubber and plastics can be processed to exact specifications to achieve the best quality possible from the starting material.

Referring to the drawings, the apparatus is designated by the letter "A". The apparatus "A", in accordance with this invention is applied to the continuous shredding, granulating, straining and extruding of hot or cold feed plastic and rubber like materials up to and including vulcanized rubber from scrap tires, and has all of the advantages as noted in the introduction. The apparatus "A" as shown in FIG. 1 has a hopper 12 with an entrance opening to barrel member 30 and to forcing section barrel 32 with rotor sections 21 and 31 of rotor 20 provided with two start helical extrusion groves and driven by drive means 11, to pressurize the process material and deliver it to transfer section rotor grooves 43, 44, and 45 which communicate with barrel grooves 41 and 42. The transfer section consists of four member to member transfers, each of which has an increased number of grooves starts; i.e. 6 to 8, 8 to 10, 10 to 12 and 12 to 15 so as to progressively produce smaller and smaller pieces of process material.

The rotor groove 45 receives the material from barrel groove 42 and, transfers the material to refining or barrier section 50 and main stream extrusion grooves as formed by ridges 52, and wide top barrier ridges 51 which cross the main stream so that all material must pass over the barriers 51 to continue downstream. The wide top of the barrier is divided into three ridges, each of which is proceeded by a groove which provides space for the rejected material and which are formed by a series of ramp like members arranged to present the material to the restrictive openings at extrusion pressure plus. As the barrier section 50 is composed of three parts, each of which is provided with three ridges. nine progressive reductions in the thickness of material can be accomplished. This reduction in size of passed material can be enormous as compared to single ridge barriers. The downstream end of the barrier section is provided with a material transfer section 70, rotor to barrel so as to communicate with the following "receiving" groove 72 of the tapered diameter barrel barrier section; which is composed of a smooth tapered rotor co-acting with a tapered bore barrel member which is provided with multiple longitudinal extending "receiving" and "sending" grooves 72 and 71. Material is entered into the "receiving" grooves 72 and the fine and fluent material is passed over the common groove top to the "sending" groove 71.

The material not passed is transported to the end of the section and discharged to atmosphere via discharge openings or ports 74 or ring 73 and to restrictive holes 75. The hole size of the restrictive hole 75 for the discharge point 74 is selected by moving the ring 73 as shown by the arrows in FIG. 14. Material passed to "sending" groves 72 is passed downstream to the barrel grooves 81 and on to the rotor grooves 82 of the end forcing section. Grooves 82 supply material to helical grooves 83 of the end forcing section. Grooves 82 in conjunction with barrel member 80 develop pressure for extrusion to atmosphere. The extrusion can be in the form of state of the art pellets, strips, slabs, one or two roll calenders or to pulverize with a stiff high speed wire brush like member.

Still referring to the drawings, the apparatus designated by the letter "A" in accordance with the invention is applied to the continuous shredding, granulating and straining of hot or cold fed polymers, particularly rubber from scrap tires and has all of the advantages as noted in the introduction. The apparatus described in FIG. 1 is divided into sections 10 through 19 as follows.;

Sections 10 and 11 are state of the art drive means and thrust bearing.

Section 12 and 13 are the feed hopper and forcing sections and are provided with two start helical extrusion grooves designed to warm, pressurize and transport the material to rotor grooves 43 of section 14.

Section 14, with FIGS. No. 2 and No. 3 show in detail the four stage transfer means of progressively shredding the material to smaller and smaller pieces i. e. 4 to 6, 6 to 8, 8 to 10, 10 to 12 and 12 to 15 at the four transfers.

"This apparatus "A" can thus be used for straining, refining, separating and extruding rubber like and plastic process materials, both hot or cold feed. The apparatus has a cylindrical barrel provided with a bore and extrusion ports 91. The apparatus also has a rotor 20, rotationally mounted in the barrel bore and operable to move the process material, from one end of the barrel 30 to the other end, and to progressively heat, develop pressure, refine, strain and separate the fine and fluent material from oversize and less fluent process material and to discharge the separated material from a different extrusion port.

The apparatus includes a hopper member 12 with both rotor and barrel being provided with helical extrusion grooves co-acting to heat, develop pressure and enter the process material into an extruder forcing section. The rotor and barrel members form a continuation of hopper grooves and provide excess capacity so as to allow for compacting the process material and to develop extrusion pressure to move the material downstream to a transfer section.

A multiple transfer section is provided with an increased number of extrusion grooves 41, 42, 43, 44, 45 at each member to member transfer, i.e. rotor to barrel 3 to 6, barrel to rotor, 6 to 9, rotor to barrel 9 to 12 and barrel to rotor 12 to 15, which impose the process material to increasingly intensive shearing and thereby develop fluent material for a following barrier section.

The following multiple stage rotor barrier section 50 consists of wide topped barriers crossing the extruder groove so as to lead off the fine and fluent process material and to detain oversize and less fluent material for extra working. The wide topped barriers include three ridges 51, each of which has decreased clearance with the barrel bore. Each of the rotor wide topped barrier ridges is preceded by a groove 53, to provide space for the detained process material and consists of a series of "ramps" which redirect the detained material to the clearance barrier top to barrel bore with extrusion pressure plus.

Downstream, the apparatus includes a tapered barrel member with multiple "receiving" extruder grooves 72 which start at capacity and progressively reduce to zero capacity and are arranged to lead off the fine and fluent process material, to adjacent "sending" extruder grooves 71, and to pass the oversize and less fluent material to atmosphere, via ports 74 at the downstream end of this section. The multiple "sending" extruder grooves are located between the "receiving" grooves, which start at zero capacity and progressively increase to capacity at the downstream of this section. The downstream "sending" grooves are arranged to receive the fine and fluent material, lead off from the "receiving" grooves, and to pass the fine and fluent material downstream to a barrel to rotor transfer section. A set of ring like spacers 61 are installed in the tapered barrel section between barrel members to adjust the clearance of the tapered barrel member to the groove tops of the tapered barrel member so as to control extrusion capacity from zero to full capacity.

All of the process material is then transferred from barrel grooves to rotor grooves. Extrusion grooves are arranged to develop pressure, transport and extrude the process material from an end discharge port 91. The discharge port 91 is arranged to extrude the material in the form of sheet, slabs, strips, pellets or powder as required for further downstream processing.

This apparatus is particularly intended for use in refining, mixing, straining, separating and extruding thermoplastic and rubber material for both hot and cold feed. Hundreds of polymers can be processed in this manner, including vulcanized rubber as obtained from scrap tires.

The apparatus comprises an elongated cylindrical barrel member 30 and an elongated rotor member 20 disposed axially in the interior of the barrel member. Rotational movement is imparted between said rotor and barrel members in treating and axially advancing the vulcanized rubber.

The rotor and barrel members have a feed end and a discharge end with a forcing zone, a transfer zone, a rotor barrier zone, an adjustable capacity barrel barrier zone, and a discharge pressurizing zone, interposed between the feed and discharge ends.

The rotor and barrel of the forcing zone are provided with multiple longitudinal extending helical grooves co-acting with multiple longitudinal extending helical barrel grooves, arranged with sharp leading edges, which co-act with each other to chop, shear the process material to reduced piece size and to warm and move the material to a four stage member to member transfer zone.

The four stage member to member transfer is provided with an increased number of extrusion grooves at each transfer, i.e. rotor to barrel 3 to 6, barrel to rotor 6 to 9, rotor to barrel 9 to 12 and barrel to rotor 12 to 15 to thereby progressively reduce the particle size of the process material and to develop some fine and fluent process material.

Multiple rotor barrier zones are provided with barriers which cross the extrusion groove and are provided with a wide top which is restrictive, wide top to barrel bore and clearance is such, that the fine and fluent material is passed downstream and the oversize and less fluent material is detained, the wide top can be in many forms, flat, tapered, etc. The preferred form, for viscous material is to provide three ridges 51, each progressively restrictive and each preceded by a groove 53 to provide space for the rejected material and is constructed from ramp like members which redirect the material back to the ridge top clearance area, thus the fluent material, which acts as a lubricant, is reduced and the imposed shear is more effective.

The adjustable capacity tapered barrel barrier zone 70 is composed of a rotor to barrel transfer which directs all of the material to "receiving" grooves 72, which receive the material, pass the fine and fluent material to the adjacent "sending" grooves 71, and pass the rejected material to downstream ports to atmosphere. The barrel member is adjustable longitudinally by means of ring like spacers 61 which act in conjunction with the tapered design to adjust clearance from full capacity to zero capacity. Groove tops of sending and receiving grooves are the same diameter.

The barrel member of the barrel to rotor transfer passes the material to multiple rotor grooves which pass the material to end forcing helical grooves which generate extrusion pressure for extrusion from the downstream end. The extrusion can be in the form of sheets, slabs, pellets or preferred powder as generated by a high speed brush abrading the exiting material.

The apparatus is for shearing and straining thermo-plastic and rubber like materials into small pellets or particles, the size of which permits chemical devulcanization and plastication by means of plasticating oils. More particularly, an apparatus is provided with a hopper and forcing section adapted to receive the selected process material, warm, pressurize and transport it downstream to a member to member transfer section. The member to member transfer section includes four stages, which progressively reduces the size of the material and produces reduced size and fluent material for a following rotor barrier section. The rotor barrier section has three stages of wide top barriers, with each barrier provided with three barrier ridges, with restrictive clearance between the barrier tops and the barrel bore. Thus nine progressively smaller openings are provided to reduce the size of the material. Preceding each barrier is a groove to provide space for the detained material needing extra work. The grooves consist of a series of ramps, which start deep and achieve zero depth so as to pressurize the material at extrusion pressure plus. As the fluent material, which acts as a lubricant, is led off downstream, increased shear is directed at the less fluent material. Following the rotor barrier section is a rotor to barrel transfer section, which directs the material to the barrel barrier section which includes side by side receiving and sending grooves actuated by a smooth conical rotor member. This conical shape permits barrier clearance, groove top to rotor, to be adjusted by longitudinal movement of the barrel member to the rotor member. Following the barrel barrier section is a member to member transfer which returns the material to the rotor member which is provided with means to receive the material, pressurize, and transport it to an extrusion port and to atmosphere. State of the art means 90 can be provided to extrude the material in the form of slab, sheet, pellets and powder as required by the projected use of the material."

What I claim is:

1. An apparatus for use in straining, refining, separating and extruding polymeric material comprising: a rotor and barrel having a bore comprising means for pressurizing and transporting the polymeric material downstream, between a feed end and a discharge end through a rotor barrier section including an extrusion groove with barriers crossing the extrusion groove, the barriers including wide tops with multiple ridges, the barriers being wider than the extrusion grooves, clearance between successive ridges and the bore of the barrel being progressively more restrictive as the polymeric material proceeds downstream, so that fine and fluent polymeric material is passed downstream and oversized and less fluent material is detained, each ridge being preceded by a groove on the wide barrier top, each barrier top groove being formed by a series of ramps arranged to present polymeric material to openings between the respective ridge and barrier bore at a relatively high extrusion pressure.

2. The apparatus of claim 1 wherein the ramps have a relatively deep end and decrease to zero depth, such that rotational movement moves material from the relatively deep end to a restrictive barrier clearance entrance at a relatively high extrusion pressure.

3. The apparatus of claim 1 wherein each wide barrier top includes three separate ridges.

4. The apparatus of claim 1 wherein the extrusion groove is formed by extrusion groove ridges, with the barriers extending between spaced points on the extrusion groove ridges across the extrusion groove.

5. An apparatus for refining, mixing, straining, separating and extruding vulcanized rubber from scrap tires comprising a rotor positioned within a barrel bore, and a barrel extending through successive zones:

a hopper;

a forcing zone including multiple helical rotor grooves including sharp leading edges to chop and shear the rubber to reduce piece size;

a rotor to barrel to rotor to barrel to rotor transfer zone for progressively reducing the particle size of the rubber;

multiple rotor barrier zones provided with barriers which cross extrusion grooves in the multiple rotor barrier zones, each barrier being relatively wide so that only fine and fluent material is passed between the relatively wide barriers and the barrel bore wherein the relatively wide barriers include multiple ridges preceded by a groove formed by a series of ramps wherein the clearance between successive ridges and the bore of the barrel is progressively more restrictive in a downstream direction and wherein each ridge is preceded by the barrier groove to provide space for detained material that is too large to pass between the corresponding ridge and the barrel bore; and a tapered barrel barrier zone including a tapered barrel and comprising a rotor to barrel transfer for directing all material to barrel grooves, with barrel spacers for adjusting the longitudinal position of the tapered barrel to adjust the clearance between the rotor and the tapered barrel in the tapered barrier zone, wherein the tapered barrel includes receiving and sending barrel grooves, the receiving grooves having a downstream end with zero capacity and openings for discharging oversize material at the downstream end of the receiving grooves.

6. The apparatus of claim 5 comprising three of the barriers, each barrier including three ridges to provide a succession of nine ridges, each of which is more restrictive in the downstream direction.

* * * * *